3,000,779
INSECT COMBATTING SULFOXIDES
Lyle D. Goodhue and Rector P. Louthan, Bartlesville, and Kenneth E. Cantrel, Dewey, Okla., assignors to Phillips Petroleum Company, a corporation of Delaware
No Drawing. Filed Aug. 5, 1958, Ser. No. 753,188
76 Claims. (Cl. 167—22)

This invention relates to the combatting of insects. In one of its aspects, the invention provides novel insect combatting agents consisting essentially of a sulfoxide of the formula

wherein $R_1$ is an unsaturated alicyclic or acyclic hydrocarbon radical having 3–10 carbon atoms having one of an ethylenic and an acetylenic bond and wherein $R_2$ can be the same as $R_1$ and can be one of any saturated and unsaturated, aliphatic and alicyclic organic radical having 3–20 carbon atoms and $R_2$ in which a hydrogen atom is replaced by

and wherein the total number of carbon atoms in the compound are 6 and do not exceed 30. In another of its aspects, the invention relates to the repelling of an insect, especially a house and/or a stable fly using a repellent consisting essentially of one of the aforesaid compounds.

The compounds herein discussed are excellent repellents for house and stable flies (*Musca domestica* and *Stomoxys calcitrans*). Indeed, the herein discussed sulfoxides have been found to be outstanding as repellents, especially for flies. This is particularly surprising since dimethyl-, tert-butyl ethyl-, di-n-propyl-, di-isobutyl-, tert-butyl n-butyl-, di-n-heptyl- and tert-octyl methyl sulfoxides possess little or no real repellency toward flies rendering these sulfoxides of no practical value as repellents. Data showing the ineffectiveness of these sulfoxides as repellents are found in run Nos. 19–25 in Table II of Serial No. 661,584, filed May 27, 1957, now Patent No. 2,957,799, by Lyle D. Goodhue, Roy E. Stansbury and Rector P. Louthan. Further, it is noted that the corresponding sulfides, while generally possessing some potency, are far less effective than the sulfoxides.

For many conditions, a repellent for insects is more desirable than a combatting agent which leads to knockdown or kill. For example, it is generally more desirable to repel insects from a table or counter on which food is placed since contamination of the food with dead insects is avoided. Use of the compounds herein disclosed for such purposes can minimize contamination and the unsightly presence of dead or paralyzed insects. The compounds and compositions herein disclosed have many attributes and have wide-spread utility.

In a more specific form of the invention, $R_2$ is now preferred to contain in the range 4–10 carbon atoms.

It is an object of the present invention to provide an insect combatting agent. It is another object of the present invention to provide a method of combatting insects, especially flies. It is a further object of the present invention to provide an insect repellent. A further object still is to provide a fly repellent. More specifically, it is an object of the present invention to provide a house fly repellent. A further object is to provide a stable fly repellent. Still another object is to provide a method of repelling house flies. Another object is to provide a method for repelling stable flies.

Other aspects, objects and the several advantages of the invention are apparent from this disclosure and the appended claims.

According to the present invention, there is provided an insect combatting agent consisting essentially of a sulfoxide as herein defined. Also, according to the present invention, there is provided a method for combatting an insect by subjecting said insect to the action of a repellent consisting essentially of a sulfoxide as herein defined.

Further, and more specifically according to the present invention, there is provided a method of repelling a fly from an animal by subjecting said animal to an application of at least one sulfoxide as defined herein in an amount to render said animal repellent to flies, especially house and/or stable flies.

Also, according to the invention, there is provided an ingredient, consisting essentially of one of the sulfoxides herein defined, especially adapted for admixture with at least one other insect combatting material or compound.

One of the problems facing the researcher today is that, although many insect combatting agents are known or suggested, few, if any, satisfy the now stringent tests which determine whether a material is an acceptable combatting agent. The problem is not to find just another material exhibiting combatting properties but rather is to find a material possessing the kind of combatting properties rendering it acceptable in the art to which it pertains as a marketable material. The compounds of the present invention, unlike certain other sulfoxides and their corresponding sulfides, are outstanding repellents for flies.

In the formula given above, $R_1$ includes the following ethylenically unsaturated hydrocarbon radicals:

| | |
|---|---|
| Allyl | 3-ethyl-1-hexenyl |
| Methallyl | 4,4-diethyl-1-hexenyl |
| Ethallyl | 1-cyclohexenyl |
| 1-butenyl | 2-cyclohexenyl |
| 2-butenyl | 3-cyclohexenyl |
| 3-butenyl | 2(3-cyclohexenyl)ethyl-3- |
| 2-methyl-1-butenyl | vinylcyclohexyl |
| 2-methyl-3-butenyl | 4-ethyl-1-cyclohexenyl |
| 1-pentenyl | 4-isopropyl-2-cyclohexenyl |
| 2-pentenyl | 1-heptenyl |
| 3-pentenyl | 6-heptenyl |
| 4-pentenyl | 4,4-dimethyl-1-octenyl |
| 2-methyl-1-pentenyl | 4-ethyl-2-octenyl |
| 2-ethyl-1-pentenyl | 1-octenyl |
| 2-ethyl-4-pentenyl | 2-octenyl |
| 3,3-dimethyl-1-pentenyl | 3-octenyl |
| 1-cyclopentenyl | 4-octenyl |
| 2-cyclopentenyl | 7-octenyl |
| 3-cyclopentenyl | 4,4-dimethyl-2-octenyl |
| 1-hexenyl | 1-nonenyl |
| 2-hexenyl | 2-nonenyl |
| 3-hexenyl | 1-decenyl |
| 4-hexenyl | 8-nonenyl |
| 5-hexenyl | 2-decenyl |
| 9-decenyl | 4-vinylcyclohexyl |
| 2-methyl-1-hexenyl | |

Acetylenically unsaturated radicals, corresponding to the above ethylenically unsaturated organic radicals, are illustrated by the following:

| | |
|---|---|
| 1-propynl | 1-octynyl |
| 2-propynyl (propargyl) | 7-octynyl |
| 1-hexynyl | 2-ethyloctynyl-3 |
| 3-hexynyl | Cyclooctynyl-3 | and the like.

The preferred of these $R_1$ groups are

| | |
|---|---|
| Allyl | Cyclohexenyl |
| Methallyl | Propargyl |
| Cyclooctenyl | |

Examples of $R_2$, in addition to the organic radicals which illustrate $R_1$, include:

| | |
|---|---|
| n-Propyl | 3-ethylcyclohexyl |
| n-Butyl | 4-ethylcyclohexyl |
| Sec-butyl | 3,6-dimethylcyclohexyl |
| Tert-butyl | 2,3,5,6 - tetramethylcyclohexyl |
| n-Octyl | |
| Sec-octyl | 2,3,5,6-tetraethylcyclohexyl |
| n-Dodecyl | 2-(cyclohexene-3)ethyl |
| n-Octadecyl | 3[2-(allylmercapto)ethyl]cyclohexyl |
| n-Eicosyl | |
| 2-hexenyl | 4-[2-(allylmercapto)ethyl]cyclohexyl |
| 5-hexenyl | |
| Cyclopentyl | 3 - [2-(allylsulfinyl)ethyl]cyclohexyl |
| Cyclohexyl | |
| Cycloheptyl | 4 - [2-(allylsulfinyl)ethyl]cyclohexyl |
| Cyclooctyl | |
| 3-vinyl-3-cyclohexenyl | Ethyl-sulfinylethyl |
| 4-vinyl-3-cyclohexenyl | Allylsulfinylethyl |
| 6-vinyl-2-cyclohexenyl | 5-cyclooctenylsulfinylcyclohexyl |
| 3-vinylcyclohexyl | |
| 4-ethyl-2-cyclohexenyl | |

Examples of sulfoxides which have the above-described structures are illustrated by the following compounds:

Allyl n-propyl
Allyl n-hexyl
Allyl n-octyl
Allyl n-octadecyl
Allyl n-eicosyl
Allyl n-2-hexenyl
Diallyl
Allyl methallyl
Allyl 5-cyclooctenyl
Allyl 3-cyclohexenyl
Allyl 4-cyclohexenyl
Allyl 2-cyclohexyl
Allyl cyclohexyl
Allyl cycloheptyl
Allyl cyclooctyl
Allyl 3-vinyl-3-cyclohexenyl
Allyl 4-vinyl-3-cyclohexenyl
Allyl 3-vinylcyclohexyl
Allyl 4-vinylcyclohexyl
Allyl 3,6-dimethylcyclohexyl
Allyl 2,3,5,6-tetraethyl-cyclohexyl
Allyl 3-[2-(allylsulfinyl)ethyl]cyclohexyl
Allyl 4-[2-(allylsulfinyl)ethyl]cyclohexyl
Methallyl n-hexyl
Methallyl n-octyl
Methallyl n-octadecyl
Dimethallyl
Methallyl 2-hexenyl
Methallyl 5-hexenyl
Methallyl 5-cyclooctenyl
Methallyl 3-cyclohexenyl
Methallyl 4-cyclohexenyl
Methallyl cyclohexyl
Methallyl cycloheptyl
Methallyl cyclooctyl
Methallyl 3-vinyl-5-cyclohexenyl
Methallyl 4-vinyl-6-cyclohexenyl
Methallyl 3-vinylcyclohexyl
Bis(3-cyclohexenyl)
2-cyclohexenyl n-octyl
3-cyclohexenyl n-octyl
3-cyclohexenyl n-octadecyl
4-cyclohexenyl n-octadecyl
2-cyclohexenyl 1-octadecenyl
4-cyclohexenyl 11-octadecenyl
3-cyclohexenyl 3-vinylcyclohexyl
4-cyclohexenyl 4-vinylcyclohexyl
Cyclohexenyl 2-(3-cyclohexyl)ethyl
4-vinylcyclohexyl 2-(3-cyclohexenyl)ethyl
Bis[2-(3-cyclohexenyl)ethyl]
Bis(3-vinylcyclohexyl)
Bis(4-vinylcyclohexyl)
3-vinylcyclohexyl 2-(3-cyclohexenyl)ethyl
Di-(5-cyclooctenyl)
5-cyclooctenyl n-octyl
5-cyclooctenyl n-dodecyl
5-cyclooctenyl n-octadecyl
5-cyclooctenyl n-eicosyl
5-cyclooctenyl cyclohexyl
5-cyclooctenyl cyclooctyl
5-cyclooctenyl 2,4-dimethylcyclohexyl
5-cyclooctenyl 3,7-dimethyl-5-cyclooctenyl
Propargyl n-octyl
Dipropargyl
Propargyl t-butyl
Propargyl n-octyl
Propargyl cyclohexyl
Propargyl cyclooctyl
Allyl 2-(cyclohexene-3)ethyl
2-(3-cyclohexyl)ethyl n-octyl
3-vinylcyclohexyl n-octyl
4-vinylcyclohexyl n-octyl
n-Octyl 3-(2-n-octylsulfinylethyl)cyclohexyl
n-Octyl 4-(2-n-octylsulfinylethyl)cyclohexyl
and the like.

Various means are known for the preparation of these sulfoxides. One convenient method involves oxidation of the corresponding sulfides. The reaction can be carried out in an organic solvent medium; such as, acetic acid, acetone or methanol. A near theoretical amount of oxidizing agent is added to the reaction mixture, preferably at temperatures in the range of about 0° to 200° C. Commonly hydrogen peroxide is employed as an oxidizing agent; however, other reagents, such as the peracids, nitric acid, chromic acid, and potassium permanganate, are employed. The sulfoxide can be recovered from the reaction mixture, commonly by dissolving or extracting in a suitable solvent, and purified by crystallization.

For the preparation of the symmetrical and unsymmetrical sulfides which are employed in the above-described process, one convenient method involves reaction of a mercaptan with the desired halide. Typical procedures illustrating the preparation of the sulfides and the oxidation of the sulfides to sulfoxides are given in the examples.

For the practice of this invention, a mixture of the sulfoxides can be employed. Useful mixtures can result from oxidation of mixtures of sulfides. For example, by addition of hydrogen sulfide to 4-vinylcyclohexene a mixture of monoadducts is produced, comprising 4-mercaptoethyl cyclohexene-1, 1-vinyl-3-mercaptocyclohexane and 1-vinyl-4-mercaptocyclohexane. This mixture of mercaptans can be reacted with an unsaturated halide, $R_1X$ where $R_1$ is an unsaturated group, as previously defined, and X is a halogen selected from the group chlorine, bromine and iodine. A mixture of sulfides is thereby produced. Purification and separation of the sulfides may be effected by any convenient method, and distillation is frequently employed. However, the mixed sulfides can be oxidized to the sulfoxides giving a mixture of sulfoxides having high value as insect repellents. If desired, the mixture of the sulfoxides can be purified.

As noted, the compounds herein disclosed are highly effective as insect repellents and especially as repellents for stable and house flies. For application, the pure compounds can be employed. However, for better overall results including convenience and economy, these compounds are frequently applied by brushing or spraying dilute solutions. Suitable solvents include naphthas, kerosenes and particularly deodorized kerosene, toluene, xylene, cyclohexanone, acetone, and isoparaffin hydrocarbon solvents such as sold under the trade name of Soltrol. The solutions prepared with these liquids can be conveniently applied as space sprays. The sprays can be readily dispensed from aerosol type bombs pressurized with a suitable propellant. These solutions can contain emulsifiers so that upon dilution with water an oil-in-water or a water-in-oil emulsion is formed. These emulsions can be brushed or sprayed. The nonionic emulsifiers, such as the condensation products of ethylene oxide with nonyl phenol, e.g., Triton X–100, are especially suitable, but there are many suitable emulsifiers. These compounds can also be blended with waxes to form a polish having insect-repelling properties. For some applications, these compounds are blended with or sorbed on clays or other powdery materials which can be blown into the atmosphere. Wettable dusts or powders, comprising these sulfoxides, can also be manufactured.

For most applications the formulation contains one or more of the sulfoxides in an amount within the range between 0.05 and 50 percent by weight of the total composition, and higher and lower concentrations can be used. These repellents are effective when employed in very small amounts. Surfaces of various kinds which are brushed or sprayed, so as to have distributed thereon a coating, are highly repellent toward insects. By way of illustration, cattle can be sprayed with about 100 ml. per animal of an emulsion which contains 0.1 to 1 gram of these sulfoxides. The sprayed cattle will be highly repellent to insects as compared with comparable unsprayed animals. Similarly, other surfaces which are brushed, sprayed, waxed, etc. with compositions comprising these sulfoxides can be made highly repellent, although the sulfoxides are present in only trace amounts. For example, amounts on the order of 0.01–0.001 gram per square foot are repellent and smaller amounts, e.g., 0.0001 gram per square foot, can give beneficial results.

For many applications these sulfoxides can be the sole insect combatting agent in the formulation. For other applications the formulation can comprise one or more of the sulfoxides with one or more other well-known insect combatting agents. An enhanced effect is obtained by the use of combinations of reagents. By way of illustration, rotenone, pyrethrum extracts and combinations of pyrethrum extracts with so-called pyrethrum synergists or extenders can be used. These synergists include Piperonyl butoxide($\alpha$-[2-(2-butoxyethyl)-ethoxy]-4,5-methylenedioxy-2-propyltoluene)
Piperonyl cyclenene(3-isoamyl-5-(methylenedioxyphenyl)-2-cyclohexenone and its 6-carbethoxy derivative. Other insect combattants can be in the composition such as MGK–264 (N-[2-ethylhexyl]bicyclo-2,2,1,5-heptene-2,3-dicarboxamide)
Diethyl n-toluamide
Methoxychlor [2,2-bis(para-methoxyphenyl)-1,1,1-trichloromethane]
Dieldrin (1,2,3,4,10,10-hexachloro-6,7-epoxy-1,4,4a,5,6,7,8,8a-octahydro-1,4-endo, exo-5,8-dimethanonaphthalene)
Lindane (gamma-benzene hexachloride)
Chlordan (1,2,4,5,6,7,8,8-octachloro-4,7-methano-3a,4,7,7a-tetrahydroindane)
Nitropyridine
N-oxide of nitropyridine and various esters of phosphoric and thiophosphoric acids and the like.

The examples illustrate the preparation of the sulfoxides herein disclosed and their value as insect combatting agents.

EXAMPLE I

Preparation of allyl n-octyl sulfoxide

The following ingredients were charged to a liter flask equipped with a thermometer, stirrer and condenser:

| | |
|---|---|
| Sodium hydroxide _____ grams__ | 66 |
| Methanol _____ cc__ | 300 |
| n-Octyl mercaptan _____ grams__ | 219 |
| Allyl bromide _____ do____ | 180.5 |

The allyl bromide was added last over a 10–15 minute period. As the allyl bromide was added, the temperature of the reaction mixture increased and the mixture refluxed. The mixture was then cooled and mixed with 500 milliliters of water to dissolve the sodium bromide which formed during the reaction. The upper organic phase which separated from the reaction mixture was recovered and washed with water. The organic phase was distilled at a pressure of about 22 mm. of mercury. The fractions boiling at 131–133° C. were collected and amounted to 260 grams or a yield of 93.2 percent based on either the mercaptan or bromide charged. The refractive index, $n_D^{20}$, of the allyl n-octyl sulfide was 1.4688.

The sulfoxide was prepared by oxidation of this sulfide by hydrogen peroxide. 150 grams of the sulfide were diluted with 250 cc. of methanol in a liter flask equipped as described above. Hydrogen peroxide (91.5 grams of a 30 percent solution) was added slowly over a period of about 20 minutes. During the addition of the peroxide the reaction mixture refluxed. Thereafter the mixture remained quiescent for approximately three hours and was then diluted with approximately 500 milliliters of water, about 1,000 milliliters of n-pentane and 500 milliliters of diethyl ether. The oil phase which separated was removed and washed with water. The sulfoxide was recovered by cooling the pentane-ether solution to about −50° C. The product was recrystallized first from ether and then from normal pentane and dried by heating to 83° C. at a reduced pressure of 1 mm. The yield amounted to 153.6 grams. The allyl n-octyl sulfoxide was a colorless liquid which crystallized on standing at room temperature (20–25° C.).

EXAMPLE II

Mixture of sulfoxides from beta-allylmercaptoethylcyclohexene-3-vinyl-3-allylmercaptocyclohexene and 1-vinyl-4-allylmercaptocyclohexene 4-vinylcyclohexene (67.5 grams) was reacted with hydrogen sulfide (85 grams) in a reactor comprising a quartz tube contained in a pressure vessel. The contents of the reaction vessel were irradiated through the quartz tube with ultraviolet light from a mercury vapor lamp. The reaction was effected at temperatures in the range of 60 to 70° F. and at pressures of about 170 to 200 p.s.i.g. The product obtained from six runs amounted to 601.2 grams. A trace (about 0.1 gram) of t-butylcatechol was added to stabilize the product which was then flash distilled at a pressure of about 15 mm. of mercury to yield 511.3 grams of a product which distilled at a kettle temperature of about 250° C. The flashed material was redistilled at a pressure of 16 mm. of mercury. The fractions distilling at 97–128° C., but consisting essentially of material boiling at 97° C., were collected and found to have a refractive index, $n_D^{20}$, of 1.5108 to 1.5172. The combined fractions represent a mixture of monoadducts comprising beta-mercaptoethylcyclohexene-3
1-vinyl-3-mercaptocyclohexane
1-vinyl-4-mercaptocyclohexane The mixture (237.6 grams) was reacted with 202 grams allyl bromide to give the corresponding sulfides. The sulfides were recovered in amount of 270 grams representing a yield of 88.7 percent and represented two fractions boiling at 124–136° C. at 15 mm. of mercury pressure and having a refractive index, $n_D^{20}$, of 1.5130 to 1.5136. These sulfides were reacted with hydrogen peroxide substantially as described in Example I using 150 grams of the sulfides diluted with 250 milliliters methanol and 92.5 grams of 30 percent hydrogen peroxide. The products were recovered from ether-pentane solution (a mixture of approximately 2 parts of pentane to 1 part of ethyl ether) by stripping at 80° C. at a pressure of 1 mm. The recovered product was a liquid at temperatures above about 25° C. and had a refractive index, $n_D^{20}$, of 1.5273. The liquid crystallized when stored at temperatures of about 10° C. This product represents a mixture of the following sulfoxides:

Allyl 2-(cyclohexene-3)ethyl sulfoxide
    Allyl 3-vinylcyclohexane sulfoxide
    Allyl 4-vinylcyclohexane sulfoxide These compounds are represented by the formulas (in the order named, respectively)

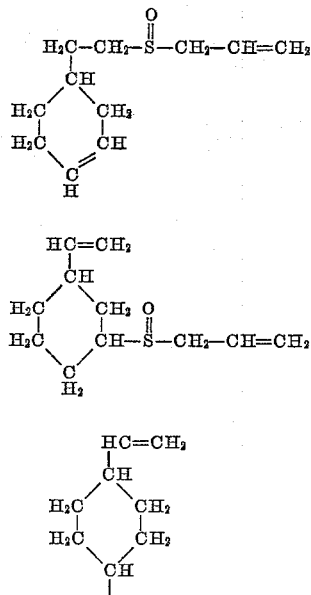

EXAMPLE III

*Mixture of sulfoxides from beta-mercaptoethyl-3-mercaptocyclohexane and beta-mercaptoethyl-4-mercaptocyclohexane*

A mixture of diadducts comprising

Beta-mercaptoethyl-3-mercaptocyclohexane
Beta-mercaptoethyl-4-mercaptocyclohexane was recovered from the run described in Example II wherein hydrogen sulfide was reacted with 4-vinylcyclohexane. After removal of the fractions distilling at 97–128° C., fractions boiling at 147–149° C. at 16 mm. of mercury pressure and having a refractive index, $n_D^{20}$, of 1.5386–1.5423 were combined. These high boiling fractions represent the diadducts named above. These diadducts were reacted with allyl bromide using the recipe:

Recipe:
    Beta-mercaptoethyl-3- and 4-mer-
        captocyclohexane _____grams__ 157.5
    Methanol _____ml__ 560
    Allyl bromide_____grams__ 227
    Sodium hydroxide_____do____ 82.5

The sulfide which was recovered was oxidized to yield
2-(allylsulfinyl)ethyl-3-allylsulfinylcyclohexane
2-(allylsulfinyl)ethyl-4-allylsulfinylcyclohexane In the preparation, 100 grams of the sulfides were diluted with 115 milliliters of methanol and reacted with 87.5 grams of 30 percent hydrogen peroxide. The water was stripped from the reaction mixture by heating at 80° C. at a pressure of 1 mm. of mercury. The yield was 109.2 grams of a slightly colored, viscous liquid having a refractive index, $n_D^{20}$, of 1.5510. This product is a mixture comprising Allyl 3-(2-allylsulfinylethyl)cyclohexyl sulfoxide
Allyl 4-(2-allylsulfinylethyl)cyclohexyl sulfoxide These compounds are represented in the order named, respectively, by the formulas:

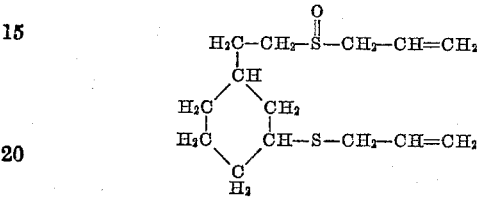

and

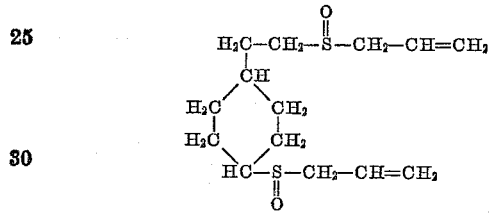

EXAMPLE IV

*Preparation of sulfoxide mixture from 4-vinylcyclohexene and n-octyl mercaptan* n-Octyl mercaptan (359 grams) was reacted with 4-vinylcyclohexene (191 grams) at a temperature of 65–71° F. while irradiated through quartz with a 100 watt mercury vapor lamp. After a 2-hour reaction period, the reaction mixture was distilled at a pressure of 4.5 mm. of mercury to recover unreacted mercaptan. The residue was distilled at 0.4 to 0.5 mm. to give monoadducts boiling at 143° C. at 0.4 mm. of mercury pressure and having a refractive index, $n_D^{20}$, of 1.4912. An analogous fraction from another run was prepared and the two fractions mixed. The sulfides were then oxidized to the sulfoxides using hydrogen peroxide. The recovered sulfoxides had a boiling point of 46–48° C. and represented a mixture of three sulfoxides:

2-(3-cyclohexenyl)ethyl n-octyl sulfoxide
3-vinylcyclohexyl n-octyl sulfoxide
4-vinylcyclohexyl n-octyl sulfoxide These compounds can be represented in the order named, respectively, by:

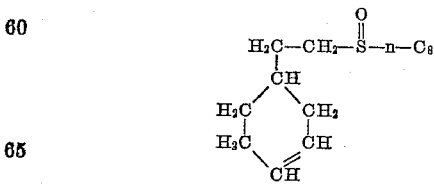

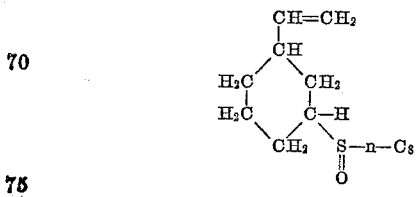

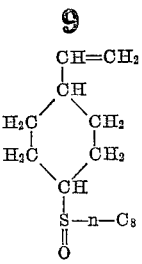

where n-C$_8$ represents the n-octyl group.

EXAMPLE V

*Preparation of allyl 5-cyclooctenyl sulfoxide*

This sulfoxide was prepared in a manner analogous to that described in Example I. The recipe for the preparation of the parent sulfide was as follows:

Recipe:
```
4-cyclooctene-1-thiol _____grams__ 117
Allyl bromide_____do____ 110
Methanol _____ml__ 250
Sodium hydroxide_____grams__ 36
```

The sulfide boiled at 121–122° C. at a pressure of 9.25 mm. of mercury. The index of refraction, $n_D^{20}$, was 1.5257. The allyl-5-cyclooctenyl sulfide (75 grams) was diluted with 125 milliliters methanol and reacted with 47 grams of 30 percent hydrogen peroxide. A yield of 80.2 grams of the sulfoxide was recovered. It had a refractive index, $n_D^{20}$, of 1.5390.

EXAMPLE VI

*Preparation of 5,5'-bis(cyclooctenyl) sulfoxide*

1,5-cyclooctadiene was reacted with hydrogen sulfide while exposed to ultraviolet light from a 100 watt mercury lamp. The procedure was substantially the same as described in Example II. The sulfide was oxidized by hydrogen peroxide to the sulfoxide as previously described. The 5,5'-bis(cyclooctenyl) sulfoxide which was recovered had a refractive index, $n_D^{20}$, of 1.5485.

EXAMPLE VII

*Sulfoxide mixture prepared from 4-vinylcyclohexene and hydrogen sulfide*

A mixture of sulfoxides was derived from 4-vinylcyclohexene by reaction of two mols of the 4-vinylcyclohexene with one mol of hydrogen sulfide while irradiating the mixture with ultraviolet light. The 4-vinylcyclohexene was cooled to −40° C. and hydrogen sulfide was bubbled through the mixture for 70 minutes while maintaining a reaction temperature between −40 and +60° C. The reaction mixture was subsequently distilled at reduced pressure. Fractions were collected which boiled at 137 to 150° C. at pressures of 0.5 to 0.8 mm. of mercury. These fractions were combined and redistilled. Cuts boiling at 133 to 153° C. at 0.2 mm. of mercury were recovered. These cuts had a refractive index, $n_D^{20}$, in the range of 1.5272 to 1.5284. Analysis indicated the product comprised monoadducts having a sulfur content of 13.4 percent by weight as compared with a calculated value of 12.8 percent.

Analogous fractions of the sulfides from other runs were combined and oxidized with hydrogen peroxide using methanol as the solvent. The sulfoxides were purified by crystallization from n-heptane. The product melted at near room temperature (20–25° C.) and had a refractive index, $n_D^{20}$, of 1.5343. This product represents a mixture comprising the following:

Bis[2-(3-cyclohexenyl)ethyl] sulfoxide
Bis[3-vinylcyclohexyl] sulfoxide
Bis(4-vinylcyclohexyl) sulfoxide
4-vinylcyclohexyl 2-(3-cyclohexenyl)ethyl sulfoxide
3-vinylcyclohexyl 2-(3-cyclohexenyl)ethyl sulfoxide The structures of these compounds are in the order presented, respectively, as follows:

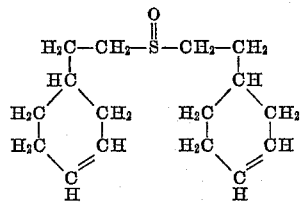
(1)

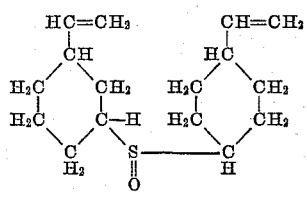
(2)

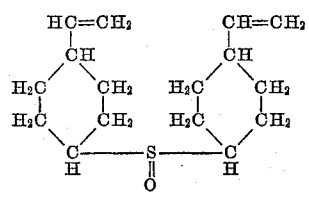
(3)

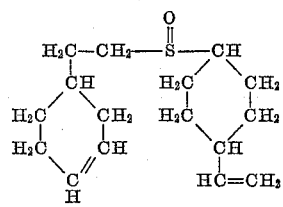
(4)

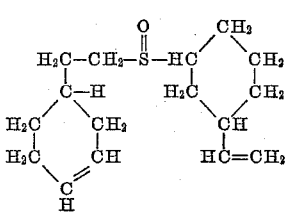
(5)

EXAMPLE VIII

This example involves proven test procedures which are outlined below.

*Sandwich bait test.*—This test involves placement of a porous barrier treated with the candidate composition between the starved insects (house flies) and food. If the chemical is repellent, the flies will not eat. If the chemical is not repellent, the insects will eat the food through the barrier. The bait is prepared as follows: A smooth thin film of unsulfured molasses is spread on a 1" x 4" strip of cardboard leaving a margin of at least ¼ inch on all sides. The purpose of the margin is to prevent the feeding of the insects unless they are actually on the strip, thus facilitating counting. These prepared strips are dried in the oven at 45° C.

Porous cover strips of lens paper are impregnated with the chemical under examination and superimposed on the bait. The paper is thin, porous, and highly absorbent. The loose fiber construction of this paper permits the fly to remove the molasses through it. In order to impregnate these strips uniformly they are immersed in an acetone solution of the material to be tested. They are then hung over a glass rod and dried for 6 hours.

Just before the test is begun the dried cover strips are carefully placed over the baits and fastened in place by stapling. In assembling the bait, care must be taken not to press down on the bait or touch it with the fingers as the molasses is easily forced up through the cover strip. Two sandwich baits are attached to a cardboard backing. The whole assembly then is clipped onto one of the jar lids that fit the opening in the rubber back of the insect cages.

The lid with the baits is fitted into the aperture in the cage so that the baits are exposed to attack. The flies are over five days old and have been starved for six hours. Counts of the number of flies feeding on the strips are taken after five and fifteen minutes and every fifteen minutes thereafter for two and a half hours. In cases where the chemical is not repellent, the flies eat all the molasses before the two and one half hours are up. In this case counts are discontinued. The non-repellents become black with flies soon after being placed in the cages. The good repellents are untouched. The difference is very striking.

*Organdy bag tests.*—This test was applied to determine repellency toward stable flies (*Etomoxys calcitrans*). For these tests a population of about 5,000 or more of the stable flies is contained in 30 cubic inch cages so that vigorous biting activity can be maintained throughout the test period. The stable flies are not fed in the morning and the tests are started at about 11 a.m. The tests are made with colonies not over one week old.

Organdy bags having 100 square inches of cloth are used. These bags are impregnated by absorbing six to seven milliliters of an acetone solution containing the desired amount (commonly 0.25 to 2 grams) candidate reagent. The bag is then air dried for about 24 hours. These impregnated bags are drawn over the hand and exposed to the stable flies. The time to first bite is recorded. If no bites are received in five minutes the bags are hung up and the test repeated the next day. If a bite is received, the time to the second and third bites is also recorded.

The results of the sandwich bait test are summarized in the attached Table I. These tests show that the disclosed sulfoxides exhibit excellent repellency. In the absence of any repellent, the number of flies feeding on the bait is too numerous for accurate counting, e.g., generally more than 30 flies, and the bait is consumed in about 15 minutes. The tests in the examples also show that good results can be obtained when the barrier is treated with solutions having 0.25 to 1 percent of the sulfoxide.

Table II illustrates the effectiveness of these compounds for repelling stable flies. In the absence of a repellent the bites are numerous and frequent, for example, on the order of one bite a second and even more. The fact that all of these reagents effectively repelled the stable flies for one day is proof of their outstanding value as repellents. In some cases, such as with methallyl n-octyl sulfoxide, the treated bag remained repellent for several days.

TABLE I.—SANDWICH BAIT TEST WITH HOUSE FLIES AND USING SULFOXIDES AS REPELLENTS

| Sulfoxides used [b] | Conc. of Soln., g./100 cc. | Number of Flies Feeding at Indicated Time (Minutes) [a] | | | | | | | | | | | | Bait Left, Percent, after Overnight Exposure |
|---|---|---|---|---|---|---|---|---|---|---|---|---|---|---|
| | | 5 | 15 | 30 | 45 | 60 | 75 | 90 | 105 | 120 | 135 | 150 | 165 | |
| Part A: | | | | | | | | | | | | | | |
| Allyl n-octyl | 0.25 | 0 | 0 | 0 | 0 | 0 | 0 | 0 | 0 | 0 | 0 | 0 | 0 | 70 |
| Methallyl n-octyl | 1.0 | 0 | 0 | 0 | 0 | 1 | 0 | 0 | 0 | 0 | 0 | 0 | 0 | 30-35 |
| Methallyl n-octyl | 0.5 | 0 | 0 | 0 | 0 | 0 | 0 | 0 | 0 | 0 | 1 | 0 | 1 | 10 |
| Methallyl n-octyl | 0.25 | 0 | 0 | 0 | 0 | 0 | 0 | 0 | 0 | 0 | 0 | 0 | 0 | 0 |
| Propargyl n-octyl | 1.0 | 0 | 0 | 0 | 0 | 0 | 0 | 0 | 0 | 0 | 0 | 0 | 0 | |
| 5-cyclooctenyl n-octyl | 1.0 | 0 | 0 | 0 | 0 | 0 | 0 | 0 | 0 | 0 | 0 | 0 | 0 | |
| 5,5'-bis(cyclooctenyl) | 0.25 | 0 | 0 | 0 | 0 | 0 | 0 | 0 | 0 | 0 | 0 | 0 | 0 | |
| Allyl 5-cyclooctenyl | 0.5 | 1 | 0 | 0 | 0 | 0 | 8 | 22 | 26 | 11 | gone | | | |
| Part B—Mixture of Sulfoxides: | | | | | | | | | | | | | | |
| Allyl sulfoxide mixture [c] | 0.5 | 0 | 0 | 3 | 5 | 21 | 39 | 31 | 16 | 14 | gone | | | |
| Diallyl sulfoxide mixture [d] | 1.0 | 0 | 0 | 6 | 4 | 16 | 46 | 20 | 15 | 6 | 5 | gone | | |
| Sulfoxides from vinylcyclohexene [e] | 0.5 | 0 | 1 | 0 | 0 | 1 | 0 | 0 | 1 | 0 | 0 | 0 | 0 | 98 |

[a] The observation "gone" at the indicated time means that the food has been consumed and the test is terminated.
[b] Lens paper was immersed in an acetone solution of the sulfoxide and then dried.
[c] Mixture of allyl 2-(cyclohexene-3)ethyl sulfoxide, allyl 3-vinylcyclohexane sulfoxide and allyl 4-vinylcyclohexane sulfoxide. Preparation described in Example II.
[d] Preparation described in Example III. Mixture of allyl 3-(2-allylsulfinylethyl)cyclohexyl sulfoxide and allyl 4-(2-allylsulfinylethyl)cyclohexyl sulfoxide.
[e] Prepared by reaction of 2 mols of 4-vinylcyclohexene with 2 mols of hydrogen sulfide and oxidation of the sulfides to sulfoxides, as described in Example VII.

TABLE II.—ORGANDY BAG TEST WITH STABLE FLIES USING SULFOXIDES AS THE REPELLENTS

| Sulfoxide Used | Seconds to bite number 1, 2 and 3 when tested on various days after treatment of bag [a] | | | | | |
|---|---|---|---|---|---|---|
| | 1 day | 2 days | 3 days | 4 days | 5 days | 6 days |
| Methallyl n-octyl | NB | 23, NB | NB | NB | 190, NB | NB |
| Allyl n-octyl | NB | NB | NB | NB | | |
| Allyl 5-cyclooctenyl | NB | 12, 12, 7 | | | | |
| 5,5'-bis(cyclooctenyl) | NB | 90, 45, 105 | | | | |
| Allyl sulfoxide mixture [b] | NB | NB | NB | 55, 15, 16 | | |

[a] NB in the tabulation indicates "no bites" during the exposure period.
[b] This mixture is described in Example II.

There are herein disclosed certain sulfoxides which are described, characterized and claimed in copending application Serial No. 766,388, filed October 10, 1958, by Rector P. Louthan.

The sulfoxides which are described and claimed in said copending application Serial No. 766,388, filed October 10, 1958, are sulfoxides having the following structural characteristics:

wherein $R_1$ is selected from the group consisting of allyl and octyl and $R_2$ is selected from the following:

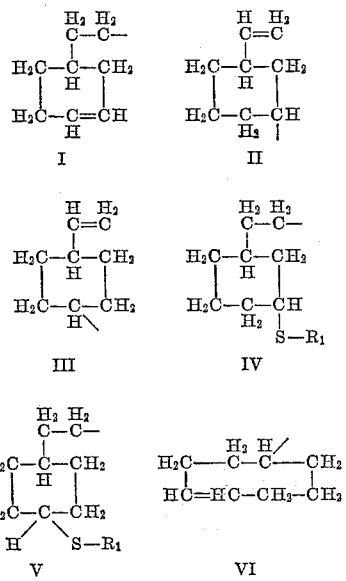

Reasonable variation and modification are possible within the scope of the foregoing disclosure and the appended claims to the invention, the essence of which is that there have been provided a new insect combatting agent consisting essentially of at least one of the sulfoxides herein defined and a method for repelling insects with at least one such sulfoxide.

We claim:

1. A method of combatting an insect which comprises subjecting said insect to an effective amount of a compound having the formula

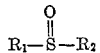

wherein $R_1$ is selected from the group consisting of unsaturated alicyclic and acyclic hydrocarbon radicals containing at least one bond selected from the group consisting of ethylenic and acetylenic bonds and having 3–10, inclusive, carbon atoms, wherein $R_2$ is selected from the group consisting of $R_1$, saturated and unsaturated aliphatic and alicyclic hydrocarbon radicals having 3–20, inclusive, carbon atoms, and $R_2$ in which a hydrogen atom is replaced by

and wherein the total number of carbon atoms in the compound is in the range 6–30.

2. A method of rendering an animal repellent to flies which comprises applying to said animal an effective quantity of a compound of claim 1.

3. A method of repelling a fly which comprises subjecting said fly to the action of a compound of claim 1.

4. A method of repelling a house fly which comprises subjecting said house fly to the action of a compound of claim 1.

5. A method of repelling a stable fly which comprises subjecting said stable fly to the action of a compound of claim 1.

6. A method of repelling a fly which comprises subjecting said fly to the action of an effective amount of allyl n-octyl sulfoxide.

7. A method of repelling a fly which comprises subjecting said fly to the action of an effective amount of allyl 2-(cyclohexene-3)ethyl sulfoxide.

8. A method of repelling a fly which comprises subjecting said fly to the action of an effective amount of allyl 3-vinylcyclohexyl sulfoxide.

9. A method of repelling a fly which comprises subjecting said fly to the action of an effective amount of allyl 3-(2-allysulfinylethyl)-cyclohexyl sulfoxide.

10. A method of repelling a fly which comprises subjecting said fly to the action of an effective amount of allyl 4-(2-allylsulfinylethyl)cyclohexyl sulfoxide.

11. A method of repelling a fly which comprises subjecting said fly to the action of an effective amount of 2-(3-cyclohexenyl)ethyl n-octyl sulfoxide.

12. A method of repelling a fly which comprises subjecting said fly to the action of an effective amount of 3-vinylcyclohexyl n-octyl sulfoxide.

13. A method of repelling a fly which comprises subjecting said fly to the action of an effective amount of 4-vinylcyclohexyl n-octyl sulfoxide.

14. A method of repelling a fly which comprises subjecting said fly to the action of an effective amount of allyl 5-cyclooctenyl sulfoxide.

15. A method of repelling a fly which comprises subjecting said fly to the action of an effective amount of 5,5'-bis(cyclooctenyl) sulfoxide.

16. A method of repelling a fly which comprises subjecting said fly to the action of an effective amount of bis[2-(3-cyclohexenyl)ethyl] sulfoxide.

17. A method of repelling a fly which comprises subjecting said fly to the action of an effective amount of bis[3-vinylcyclohexyl] sulfoxide.

18. A method of repelling a fly which comprises subjecting said fly to the action of an effective amount of bis[4-vinylcyclohexyl] sulfoxide.

19. A method of repelling a fly which comprises subjecting said fly to the action of an effective amount of 4-vinylcyclohexyl 2-(3-cyclohexenyl)ethyl sulfoxide.

20. A method of repelling a fly which comprises subjecting said fly to the action of an effective amount of 3-vinylcyclohexyl 2-(3-cyclohexenyl)ethyl sulfoxide.

21. A method of repelling a fly which comprises subjecting said fly to the action of an effective amount of methylallyl n-octyl sulfoxide.

22. A method of repelling a fly which comprises subjecting said fly to the action of an effective amount of propargyl n-octyl sulfoxide.

23. A method of repelling a fly which comprises subjecting said fly to the action of an effective amount of 5-cyclooctenyl n-octyl sulfoxide.

24. A method of repelling a fly which comprises subjecting said fly to the action of an effective amount of allyl n-propyl sulfoxide.

25. A method of repelling a fly which comprises subjecting said fly to the action of an effective amount of allyl n-hexyl sulfoxide.

26. A method of repelling a fly which comprises subjecting said fly to the action of an effective amount of allyl n-octadecyl sulfoxide.

27. A method of repelling a fly which comprises subjecting said fly to the action of an effective amount of allyl n-eicosyl sulfoxide.

28. A method of repelling a fly which comprises subjecting said fly to the action of an effective amount of allyl n-2-hexenyl sulfoxide.

29. A method of repelling a fly which comprises subjecting said fly to the action of an effective amount of diallyl sulfoxide.

30. A method of repelling a fly which comprises subjecting said fly to the action of an effective amount of allyl methallyl sulfoxide.

31. A method of repelling a fly which comprises subjecting said fly to the action of an effective amount of allyl 3-cyclohexenyl sulfoxide.

32. A method of repelling a fly which comprises subjecting said fly to the action of an effective amount of allyl 4-cyclohexenyl sulfoxide.

33. A method of repelling a fly which comprises subjecting said fly to the action of an effective amount of allyl 2-cyclohexenyl sulfoxide.

34. A method of repelling a fly which comprises subjecting said fly to the action of an effective amount of allyl cyclohexyl sulfoxide.

35. A method of repelling a fly which comprises subjecting said fly to the action of an effective amount of allyl cycloheptyl sulfoxide.

36. A method of repelling a fly which comprises subjecting said fly to the action of an effective amount of allyl cyclooctyl sulfoxide.

37. A method of repelling a fly which comprises subjecting said fly to the action of an effective amount of allyl 3-vinyl-3-cyclohexenyl sulfoxide.

38. A method of repelling a fly which comprises subjecting said fly to the action of an effective amount of allyl 4-vinyl-3-cyclohexenyl sulfoxide.

39. A method of repelling a fly which comprises subjecting said fly to the action of an effective amount of allyl 3,6-dimethylcyclohexyl sulfoxide.

40. A method of repelling a fly which comprises subjecting said fly to the action of an effective amount of allyl 2,3,5,6-tetraethylcyclohexyl sulfoxide.

41. A method of repelling a fly which comprises subjecting said fly to the action of an effective amount of methylallyl n-hexyl sulfoxide.

42. A method of repelling a fly which comprises subjecting said fly to the action of an effective amount of methylallyl n-octadecyl sulfoxide.

43. A method of repelling a fly which comprises subjecting said fly to the action of an effective amount of dimethallyl sulfoxide.

44. A method of repelling a fly which comprises subjecting said fly to the action of an effective amount of methallyl 2-hexenyl sulfoxide.

45. A method of repelling a fly which comprises subjecting said fly to the action of an effective amount of methallyl 5-hexenyl sulfoxide.

46. A method of repelling a fly which comprises subjecting said fly to the action of an effective amount of methallyl 5-cyclooctenyl sulfoxide.

47. A method of repelling a fly which comprises subjecting said fly to the action of an effective amount of methallyl 3-cyclohexenyl sulfoxide.

48. A method of repelling a fly which comprises subjecting said fly to the action of an effective amount of methallyl 4-cyclohexenyl sulfoxide.

49. A method of repelling a fly which comprises subjecting said fly to the action of an effective amount of methallyl cyclohexyl sulfoxide.

50. A method of repelling a fly which comprises subjecting said fly to the action of an effective amount of methallyl cycloheptyl sulfoxide.

51. A method of repelling a fly which comprises subjecting said fly to the action of an effective amount of methallyl cyclooctyl sulfoxide.

52. A method of repelling a fly which comprises subjecting said fly to the action of an effective amount of methallyl 3-vinyl-5-cyclohexenyl sulfoxide.

53. A method of repelling a fly which comprises subjecting said fly to the action of an effective amount of methallyl 4-vinyl-6-cyclohexenyl sulfoxide.

54. A method of repelling a fly which comprises subjecting said fly to the action of an effective amount of methallyl 3-vinylcyclohexyl sulfoxide.

55. A method of repelling a fly which comprises subjecting said fly to the action of an effective amount of bis(3-cyclohexenyl) sulfoxide.

56. A method of repelling a fly which comprises subjecting said fly to the action of an effective amount of 2-cyclohexenyl n-octyl sulfoxide.

57. A method of repelling a fly which comprises subjecting said fly to the action of an effective amount of 3-cyclohexenyl n-octyl sulfoxide.

58. A method of repelling a fly which comprises subjecting said fly to the action of an effective amount of 3-cyclohexenyl n-octadecyl sulfoxide.

59. A method of repelling a fly which comprises subjecting said fly to the action of an effective amount of 4-cyclohexenyl n-octadecyl sulfoxide.

60. A method of repelling a fly which comprises subjecting said fly to the action of an effective amount of 2-cyclohexenyl 1-octadecenyl sulfoxide.

61. A method of repelling a fly which comprises subjecting said fly to the action of an effective amount of 4-cyclohexenyl 11-octadecenyl sulfoxide.

62. A method of repelling a fly which comprises subjecting said fly to the action of an effective amount of 3-cyclohexenyl 3-vinylcyclohexyl sulfoxide.

63. A method of repelling a fly which comprises subjecting said fly to the action of an effective amount of 4-cyclohexenyl 4-vinylcyclohexyl sulfoxide.

64. A method of repelling a fly which comprises subjecting said fly to the action of an effective amount of cyclohexenyl-2-(3-cyclohexyl)ethyl sulfoxide.

65. A method of repelling a fly which comprises subjecting said fly to the action of an effective amount of di-(5-cyclooctenyl) sulfoxide.

66. A method of repelling a fly which comprises subjecting said fly to the action of an effective amount of 5-cylcooctenyl n-dodecyl sulfoxide.

67. A method of repelling a fly which comprises subjecting said fly to the action of an effective amount of 5-cyclooctenyl n-octadecyl sulfoxide.

68. A method of repelling a fly which comprises subjecting said fly to the action of an effective amount of 5-cyclooctenyl n-eicosyl sulfoxide.

69. A method of repelling a fly which comprises subjecting said fly to the action of an effective amount of 5-cyclooctenyl cyclohexyl sulfoxide.

70. A method of repelling a fly which comprises subjecting said fly to the action of an effective amount of 5-cyclooctenyl cyclooctyl sulfoxide.

71. A method of repelling a fly which comprises subjecting said fly to the action of an effective amount of 5-cyclooctenyl 2,4-dimethylcyclohexyl sulfoxide.

72. A method of repelling a fly which comprises subjecting said fly to the action of an effective amount of 5-cyclooctenyl 3,7-dimethyl-5-cyclooctenyl sulfoxide.

73. A method of repelling a fly which comprises subjecting said fly to the action of an effective amount of dipropargyl sulfoxide.

74. A method of repelling a fly which comprises subjecting said fly to the action of an effective amount of proparyl t-butyl sulfoxide.

75. A method of repelling a fly which comprises subjecting said fly to the action of an effective amount of propargyl cyclohexyl sulfoxide.

76. A method of repelling a fly which comprises subjecting said fly to the action of an effective amount of propargyl cyclooctyl sulfoxide.

References Cited in the file of this patent

UNITED STATES PATENTS

| | | |
|---|---|---|
| 1,986,218 | Remy | Jan. 1, 1935 |
| 2,043,941 | Williams | June 9, 1936 |

(Other references on following page)

UNITED STATES PATENTS

| | | |
|---|---|---|
| 2,045,925 | Remy | June 30, 1936 |
| 2,654,667 | Goodhue | Oct. 6, 1953 |
| 2,893,911 | Raasch | July 3, 1959 |
| 2,944,932 | Stansbury | July 12, 1960 |

OTHER REFERENCES

U.S.D.A., Bulletin No. E-585, January 1943, pp. 1 and 11.

U.S.D.A., Bulletin No. E-585, May 1939, pp. 1, 2, 3, 6.

Jones: 649 O.G. 603, August 14, 1951.